H. F. SAMSTAG.
TOY.
APPLICATION FILED MAY 25, 1910.

966,127.

Patented Aug. 2, 1910.

Witnesses:

Inventor
Henry F. Samstag
By his Attorneys

THE NORRIS PETERS CO., WASHINGTON, D. C.

UNITED STATES PATENT OFFICE.

HENRY F. SAMSTAG, OF NEW YORK, N. Y.

TOY.

966,127.

Specification of Letters Patent.

Patented Aug. 2, 1910.

Application filed May 25, 1910. Serial No. 563,285.

*To all whom it may concern:*

Be it known that I, HENRY F. SAMSTAG, a citizen of the United States, residing at New York city, borough of Manhattan, in the county of New York and State of New York, have invented certain new and useful Improvements in Toys, of which the following is a specification.

My invention relates to a toy and more particularly to one combining in its make-up a body, limbs and head characteristic of a wild or domestic four-legged animal, and below said head an opening in which is set a face having the characteristic features of a human being, preferably the face of a child.

The invention will be understood by reference to the accompanying drawings in which—

Figure 1:
Figure 2:
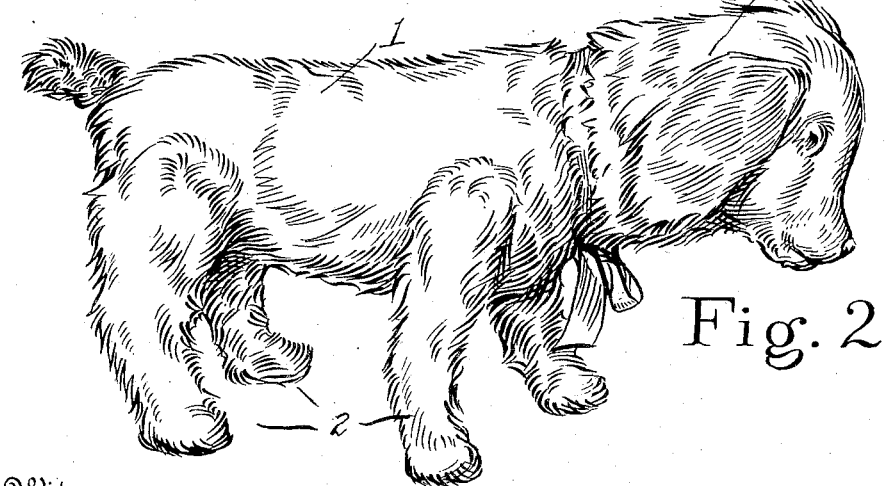

Figure 1 is a front view, and Fig. 2 a side view of a toy embodying the same.

Referring to the drawings, the numeral 1 designates a body, made of any suitable material, to which movable limbs 2 are secured, in a well-known manner. The head 3 forms a continuation of the body and in design may be made to conform to any four-legged domestic or wild animal, that of a dog being shown in the drawings. Immediately below the head, and in that portion of the body corresponding to the throat of the animal, I provide an open space, and in such space set a face having the characteristic features of a human being, preferably that of a child.

The outer covering of the body, limbs and head may be made of any suitable material to give the appearance of the desired animal, as is usual in animal toys, and the head portion will contain the complete features of the animal, as clearly shown in the drawings. The face 4 of the child may be made of any suitable and known material or composition and may be secured in position by cement or by stitching. The body may be filled with suitable material. The head 3 of the animal is so set as to form a hood or cowl over the face 4 so that the latter will be practically concealed when the toy is set on all-fours, or in side view, as shown in Fig. 2. The face 4 becomes visible only when the toy is set upright, as shown in Fig. 1. Instead of merely the face 4 stitched or cemented to the animal body, I may secure to said body a complete head of a child doll over which the animal head, constituting the hood or cowl, may be slipped on or off at pleasure, and when on, the face 4 only will be exposed as in Fig. 1.

The present toy has been designed with a view to giving a child a pleasing animal object with which to amuse itself, and one which can be converted into an animal by placing on all fours, and by a mere change of position the child face may be exposed.

It is to be understood that my invention is not limited to the particular animal shown, the dog being selected merely as an example of what may be done with other animals such as a sheep, a cow, an elephant, etc. The legs and head may be articulated as usual in toys of this character.

What I claim and desire to secure by Letters Patent of the United States is;—

1. A toy having a body, limbs and a head, said head having the characteristic features of a wild or domestic animal, said body having an opening immediately below the head, and a face having the characteristic features of a human being set in said opening.

2. A toy having a body, limbs and a head, said head having the characteristics of a wild or domestic animal, and a face of a human being set below said head so as to be practically concealed in side view.

3. A toy having a body, limbs and a head, a face having the characteristic features of a human being set into an opening below said head, said head having the characteristic features of a wild or domestic animal and forming a hood or cowl for said face so as to practically conceal the latter in side view.

4. A toy having a body, limbs and head characteristic of a wild or domestic four-legged animal, said body having an opening below the head, and a face having the characteristic features of a human being set in said opening so as to be practically concealed when the toy is stood on all fours, or in side view.

5. A toy having a body, limbs and a head, said head having the characteristics of a wild or domestic animal and covering a head having a face of a human being, said face being exposed in an opening of the body, and said animal head forming a hood or cowl for said human head and adapted to be slipped on or off said head at pleasure.

In testimony whereof I have hereunto signed my name in the presence of two subscribing witnesses.

HENRY F. SAMSTAG.

Witnesses:
CHARLES S. JONES,
C. G. HEYLMUN.